United States Patent
Bandyopadhyay et al.

(10) Patent No.: US 9,246,677 B2
(45) Date of Patent: Jan. 26, 2016

(54) METHOD AND SYSTEM FOR SECURE DATA COMMUNICATION BETWEEN A USER DEVICE AND A SERVER

(71) Applicant: Infosys Limited, Bangalore (IN)

(72) Inventors: Gautam Bandyopadhyay, Bangalore (IN); Shivaji Bal Apte, Bangalore (IN); Philip Joseph, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/220,114

(22) Filed: Mar. 19, 2014

(65) Prior Publication Data

US 2015/0006894 A1    Jan. 1, 2015

(30) Foreign Application Priority Data

Jul. 1, 2013   (IN) .......................... 2903/CHE/2013

(51) Int. Cl.
*H04L 9/08*     (2006.01)
*H04L 9/32*     (2006.01)

(52) U.S. Cl.
CPC ............ *H04L 9/0822* (2013.01); *H04L 9/0866* (2013.01); *H04L 9/3236* (2013.01); *H04L 2209/56* (2013.01)

(58) Field of Classification Search
CPC .... H04L 9/0822; H04L 9/3236; H04L 9/0861
USPC .............. 713/168, 171, 183, 185; 380/28, 30, 380/258
See application file for complete search history.

(56) References Cited

U.S. PATENT DOCUMENTS

| | | | | |
|---|---|---|---|---|
| 8,126,814 B2* | 2/2012 | Yellai | ................... | G06F 21/105 705/56 |
| 2006/0090074 A1* | 4/2006 | Matoba | ............... | H04L 63/0272 713/171 |
| 2008/0181403 A1* | 7/2008 | Sakamoto | ............. | H04L 9/3236 380/258 |
| 2009/0024848 A1* | 1/2009 | Takasugi et al. | .............. | 713/169 |
| 2011/0066843 A1* | 3/2011 | Newman et al. | .............. | 713/153 |

OTHER PUBLICATIONS

"The Order of Encryption and Authentication for Protecting Communications (Or: How Secure is SSL?)?"—Hugo Krawczyk, IACR, Jul. 2001 https://www.iacr.org/archive/crypto2001/21390309.pdf.*

* cited by examiner

*Primary Examiner* — Randy Scott
(74) *Attorney, Agent, or Firm* — Klarquist Sparkman, LLP

(57) ABSTRACT

The present disclosure discloses a method, a system and a computer program product for secure data communication between a user device and a server. User credentials, a device id and a first hash are received at server from a user device. The first hash is generated using the user credentials. At server, a second hash is computed using the user credentials stored in the database of the server. The first hash is verified with the second hash. Once verified, an encryption key and a sequence number corresponding to the user credentials and device id are generated. The encryption key and the sequence number are encrypted using a pre-defined key and one or more user credentials. The encrypted encryption key and the sequence number are sent to the user device to encrypt data.

30 Claims, 8 Drawing Sheets

METHOD AND SYSTEM FOR SECURE DATA COMMUNICATION BETWEEN A USER DEVICE AND A SERVER

FIELD

The field relates to a method and system for secure data communication and more particularly to securely storing the data.

BACKGROUND

Securely communicating data has been an important issue in today's online computing and data environment. It gains higher importance when the data is related with financial transactions. Typically, a user uses physical cards on a merchants device (that is a point of sale terminal from where the user may have availed any service/product) to make the financial payment. The physical card stores the sensitive data. Generally, the merchant device is loaded with applications that read the data from the physical card, after the user swipes the card onto the merchant's machine.

The recent improvement in this field extends where the user devices such as a mobile phone, PDA etc. are currently loaded with application that reads the data from a card swipe or in the more recent forms—receives an equivalent of card swipe through NFC (near field communication) or other means such as DTF. Card information along with payment details then travels to the acquiring system and finally through payment networks such as Master, Visa, Diners, etc. the information travels to the issuing bank. Such card information and other sensitive information are stored in the secured element of the user device or in the Secure Element in the SIM card. This technique of storing the sensitive information in secure element brings critical dependencies on SIM card owners (such as Telecommunication companies) and/or Phone manufacturers, thus limiting innovation and adoption by financial services industry.

There is a general need to enable a user to perform card transactions without any dependency on storage of sensitive information in the secure element. Several aspects of the present disclosure facilitate the easier way to enable card transactions by securely storing card details (and other sensitive details) without dependency on phone manufacturer or SIM card owner as described in below sections.

SUMMARY

The present disclosure discloses an embodiment for secure data communication between a user device and a server. User credentials, a device id and a first hash are received at server from a user device. The first hash is generated using the user credentials. At server, a second hash is computed using the user credentials stored in the database of the server. The first has is verified with the second hash. Once verified, an encryption key and a sequence number corresponding to the user credentials and device id are generated. The encryption key and the sequence number are encrypted using a pre-defined key and one or more user credentials. The encrypted encryption key and the sequence number are sent to the user device to encrypt data. User device may store the encrypted data and the sequence number in user device memory. Whenever required, the user device can retrieve the encrypted data and the sequence number from its memory and may decrypt the data using the encryption key and the sequence number. This will help in keeping the sensitive data secure in the user device.

In one embodiment of the present disclosure, a method is disclosed for secure data communication executed by a user device. User device receives one or more user credentials for a user. A first hash is generated using the user credentials. User device sends the user credentials, device id and the first hash to the server. User device receives an encrypted encryption key and an encrypted sequence number form the server. The encrypted encryption key and the encrypted sequence number are encrypted using a pre-defined key and one or more user credentials.

In yet another embodiment, user device may generate a third hash using the user credentials and the sequence number stored in the memory of the user device. The server receives one or more user credentials, a device id and the third has form the user device. The third hash is verified with fourth hash at the server wherein the fourth hash is computed from the one or more user credentials and the sequence number stored in the database of the server. Once verified, an encryption key corresponding to the user credentials and device id are generated. The encryption key is encrypted using a pre-defined key and a sequence number. The encrypted encryption key is sent to the user device. The encrypted encryption key can be decrypted using the pre-defined key and the sequence number at the user device and hence, may be used to encrypt data.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings. While the invention described herein is provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof.

Figure 1:
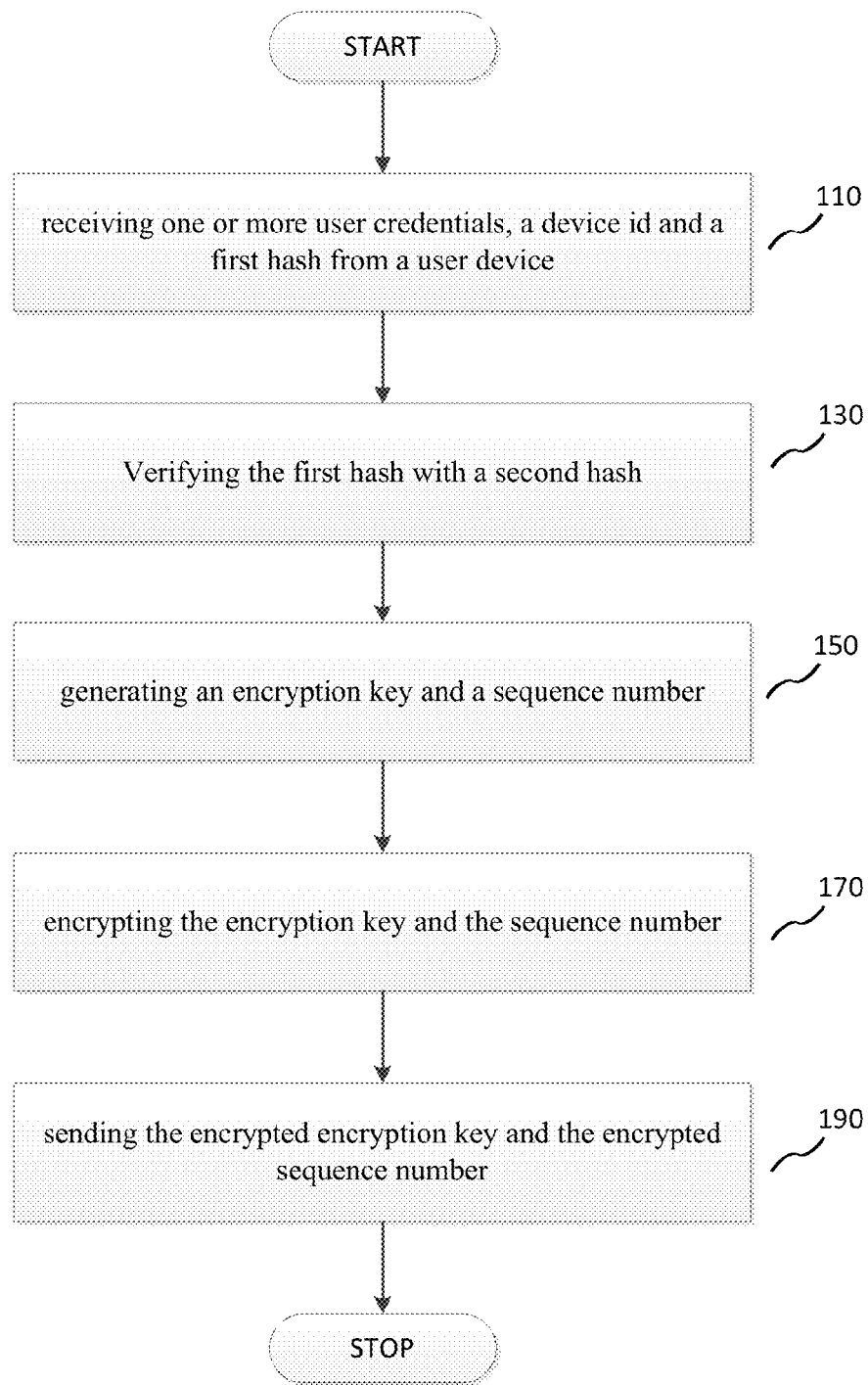
FIG. 1 illustrates a process for secure data communication.

FIG. 1 illustrates a process for secure data communication to perform card transactions without any dependency on storage of sensitive information in the secure element of a user device. At step 110, one or more user credentials, a device id and a first hash from a user device is received. User credentials may include a user ID or a username, a password and a verification code. A user ID or username is a unique identification for a user. Password and verification code may refer to a random numbers, alphabets, special characters or combination thereof. Password may be select by the user. Verification code may either be selected by the user or may be auto-generated by a system. The first hash herein refers to the hash value generated from one or more user credentials such as password and/or verification code at the user device. The device ID refers to the unique id of the user device and can be generated using MSISDN, IMEI, MAC address or the combination thereof.

At step 130, the first hash is verified with a second hash. The second hash herein refers to a hash computed from the one or more user credentials stored at the server. If the first hash is same as the second hash, the user device is authenticated and is enabled to receive the further data from the server. At step 150, an encryption key and a sequence number corresponding to the user credentials and the device id are generated. The encryption key may be used to encrypt the sensitive information required to perform the card transaction. Further, the encryption key can be used to encrypt a data to be transferred to the server from a user device or vice versa. At step 170, the encryption key and the sequence number are encrypted using a pre-defined key and the one or more user credentials. At step 180, the encrypted encryption key and the encrypted sequence number are sent to the user device to encrypt data. In one embodiment, the encryption key encrypts the data and the encrypted data may be stored in the user device.

In another embodiment, the data can be encrypted using the encryption key and the sequence number. The user device can increment the sequence number and store the incremented number in the user device. The encrypted data when received at the server can be decrypted using the encryption key and the sequence number stored corresponding to the user credentials and the device id stored in the server. The sequence number may be incremented and stored at the server side for subsequent transaction of data. Incrementing the sequence number after every transaction provide an extra security over the transacted data. The increment of the sequence number can be determined using any mathematical operation such as addition, subtraction, division and the like. In case, data is required to be sent to the user device, the data can be encrypted with the encryption key and the sequence number and sent to the user device. User device can decrypt the encrypted data using the encryption key and the sequence number which were sent to the user device previously.

Figure 2:
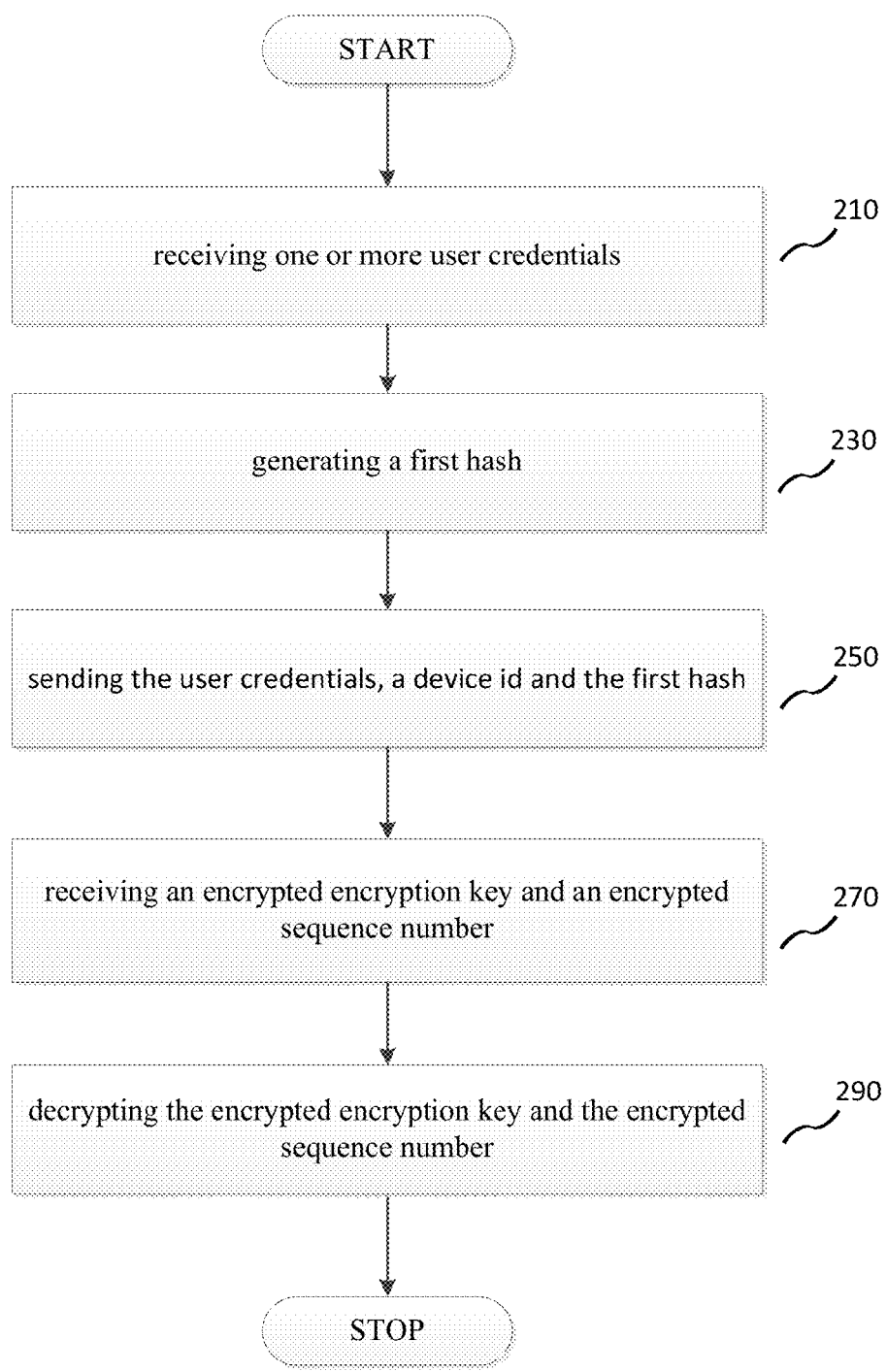
FIG. 2 illustrates an embodiment of the process for secure data communication at the user device.

FIG. 2 illustrates an embodiment of the process for secure data communication at the user device. At step 210, the user device receives one or more user credentials from a user. The user credentials may identify the user who is planning to receive an encryption key to encrypt the data at the user device. At step 230, a first hash is generated using the one or more credentials provided by the user. At step 250, user device sends the user credentials, a device ID and the first hash to the server. After the user device is authenticated based on the first hash, at step 270, an encrypted encryption key and an encrypted sequence number are received at the user device. At step 290, the encrypted encryption key and an encrypted sequence number are decrypted using a pre-identified key and the user credentials. These encryption key and sequence number can be used to encrypt and decrypt any data.

Figure 3:
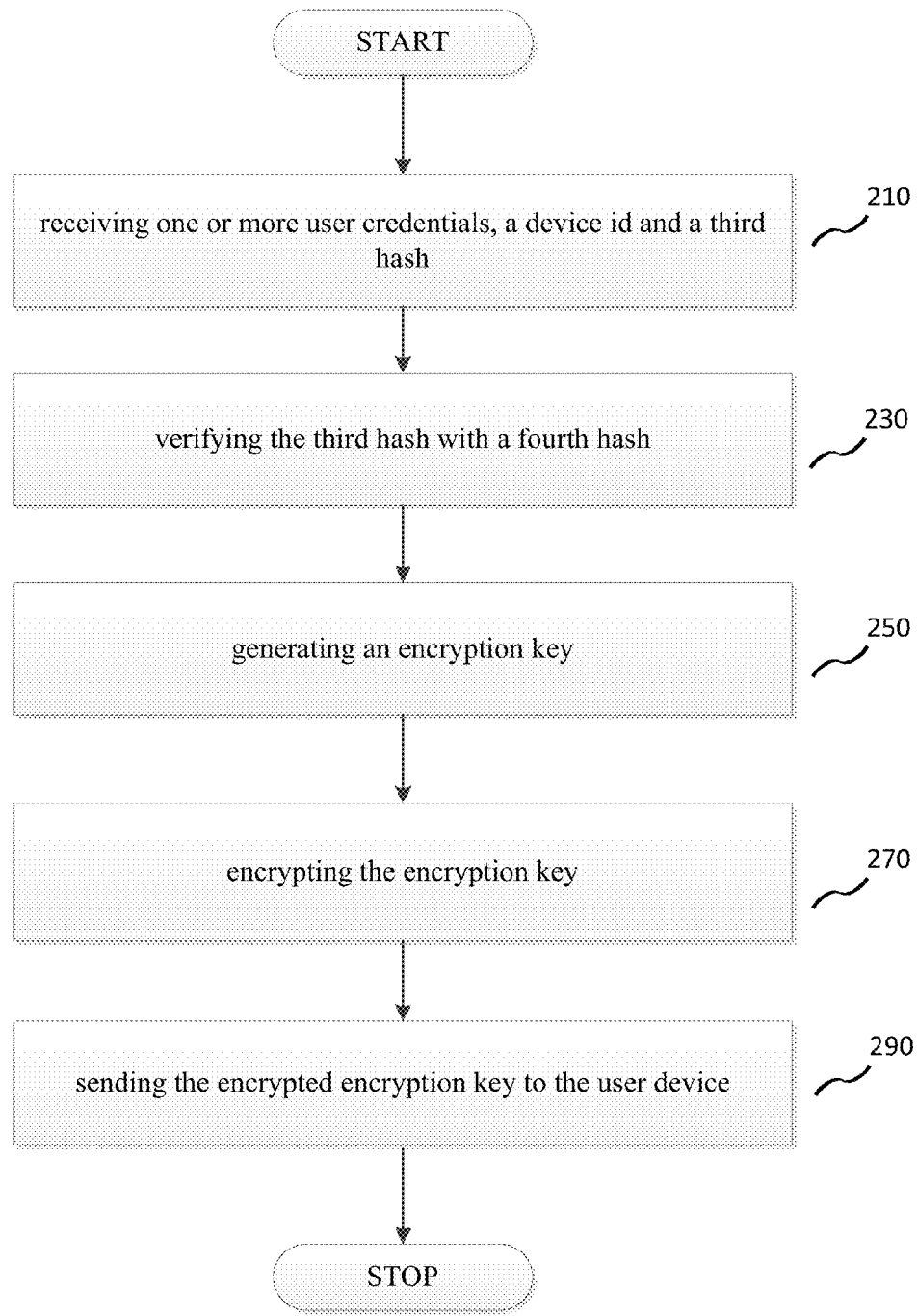
FIG. 3 illustrates an embodiment of the process for secure data communication between a user device and a server.

FIG. 3 illustrates an embodiment of the process for secure data communication between a user device and a server. In one embodiment, when a sequence number is already stored in the user device, then a hash value may be generated using one or more user credential and the sequence number which is referred herein as a third hash. At step 310, the user credentials, a device ID and the third hash is received for the user device. At step 330, the third hash is verified with Fourth hash which is computed using the user credentials and the sequence number stored corresponding to the device ID and user credentials at the server. At step 350, after the third hash is verified against the fourth hash, an encryption key is generated for the user device. At step 370, the encryption key is encrypted may be with a predefined key. At step 390, the encrypted encryption key is send to the user device. At user device, the encryption key can be used to encrypt the data. To add more security, the data can be encrypted using the encryption key and the sequence number stored in the user device.

Further, in another embodiment, the sequence number can be incremented. As appreciated by a person skilled in the art, the increment in the sequence number can be time based or may be based on the receipt of the encryption key at the user device or using other known mechanism. The increment of the sequence number at the user device has to be synchronized with the increment of the sequence number at server. In another embodiment, if an encrypted data is received at the user device, the encrypted data can be decrypted using the encryption key and the incremented sequence number if the data is encrypted using the incremented sequence number.

Figure 4:
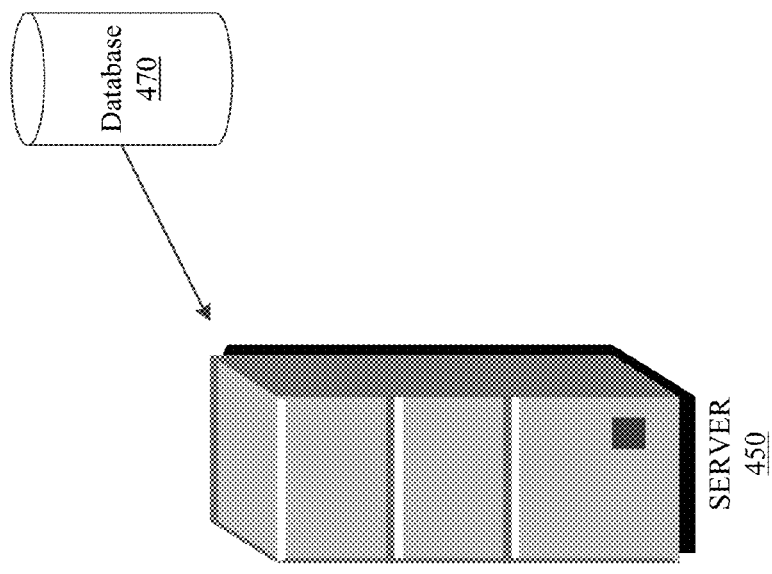
FIG. 4 shows an exemplary system depicting a secure data communication between elements of the system.
Figure 4:
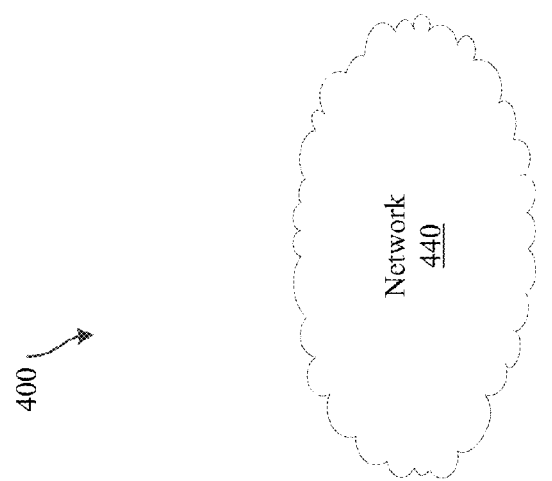
Figure 4:
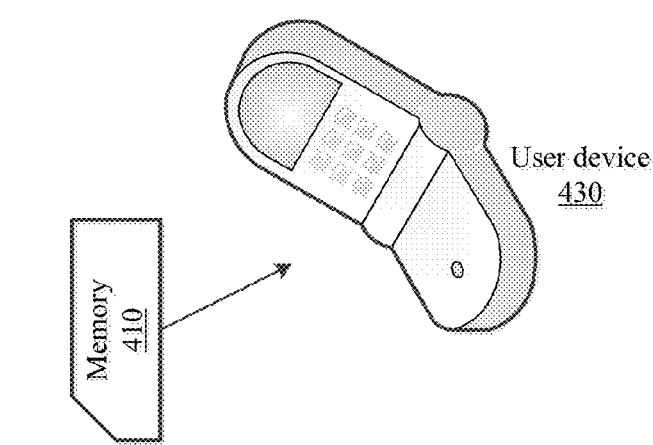

FIG. 4 shows an exemplary system 400 depicting a secure data communication between elements of the system. System 400 comprises of a network 440 which can be a wired network or a wireless network. Any kind of wired technology or wireless technology known in the art may be acceptable for use with the present invention. For example, network 440 may rely on technologies like Wi-Fi or cellular technologies and may include internet. Network 440 may allow the communication between the user device 430 and server 450. As appreciate by a person skilled in the art, any number of different devices may comprise the network 440 and any number of protocols or technologies may be utilized by the computing devices to communicate with the network 440.

The user device 430 may be any computing device which is capable of establishing a connection with network 440. User device 430 may have a Memory 410. Memory 410 may be external or internal to the user device and capable of storing data, instruction, information and the like. User device 430 communicates with server 450 via network 440. Server 450 herein refers to one or more computing devices designed to perform steps to facilitate secure communication between user device and one or more computing devices. For example, generating an encryption key and/or sequence number for the user device 430 which can be used by the user device 430 to encrypt data either to be stored in the memory 410 or be sent to other computing device. Server 450 may include a database 470 which may be capable for storing data, information, instructions and the like. As appreciated by the skilled person in the art, one or more of the above mentioned components of the system 400 along with the other components as required by the technology can be utilized to perform the steps to implement the method described in this disclosure.

User device 430 receives the user credentials from the user and a first hash is generated using the user credentials. Server 450 receives the user credentials, device ID and the first hash from the user device via network 440. The first hash is verified with a second hash for authenticating user device 430. The second hash is the hash value computed from the one or more user credentials may be stored at database 470 of server 450 or in some internal storage area of server 450. After verifying the first hash, server 450 generates an encryption key and a sequence number corresponding to the user credentials and the device id. The encryption key can be generated using any presently known or future developed encryption key generation technology. For sending the encryption key and the sequence number to user device 430, the encryption key and the sequence number are encrypted using a predefined key and one or more user credentials at server 450 and sent to the user device 430 via network 440. The predefined key can be already stored in the user device or can be transmitted by the server using any encryption technology.

User device 430 may decrypt the encryption key and the sequence number using the pre-defined key. After decrypting, the encryption key and the sequence number can be used to encrypt the data and store the encrypted data in the memory of the user device or can be used to send the encrypted data to server 450 or to any other computing device. In one embodiment, if the data is required to be used by the user device, the data can be decrypted using the encryption key and the sequence number (can be stored in the memory 410) and then, can be used. Once the encryption is done, the sequence number may be incremented and for encryption of any other data, the encryption key and the incremented sequence number will be used for encryption of that data. Hence, the sequence number can be incremented after every encryption. The same increment of the sequence number will be enabled at server 450 so that the data encrypted with the encryption key and the incremented sequence number can be decrypted using the encryption key and the incremented sequence number stored in database 470 of server 450.

Figure 5A:
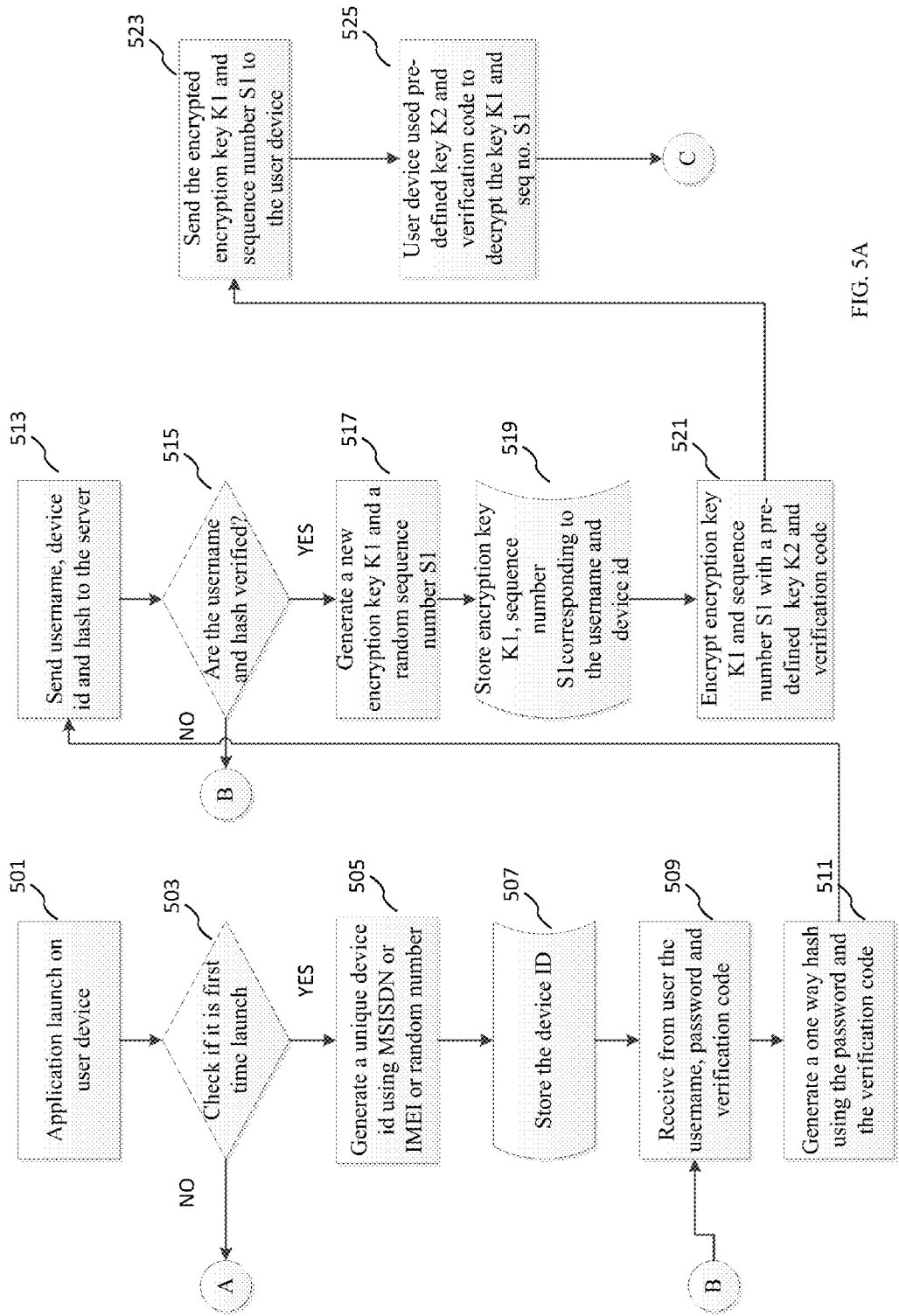
FIGS. 5A, 5B, 5C illustrates an example embodiment of the process of receiving an encryption key by a user device, to encrypt sensitive information in a secure manner as per an aspect of the present disclosure.
Figure 5B:
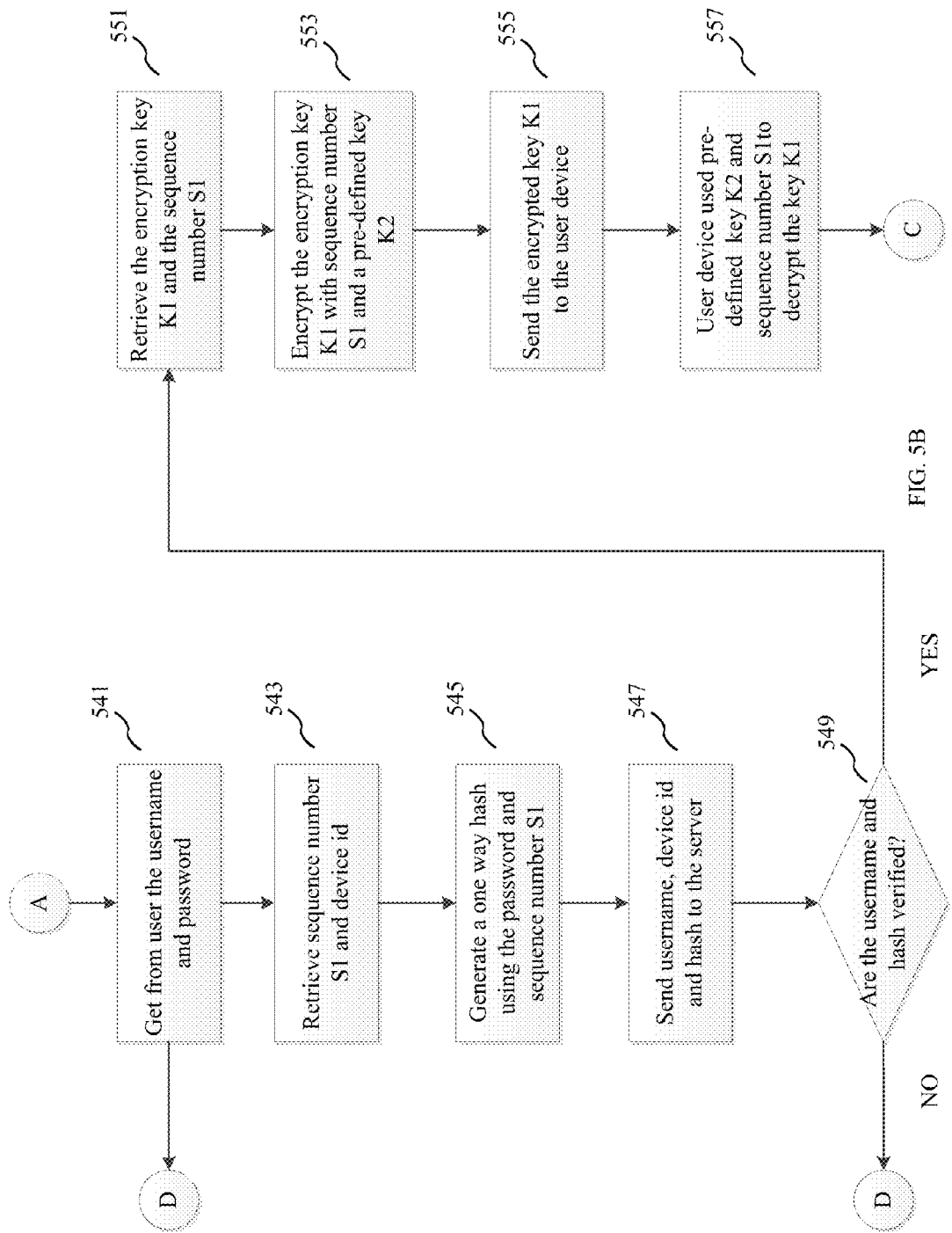
Figure 5C:
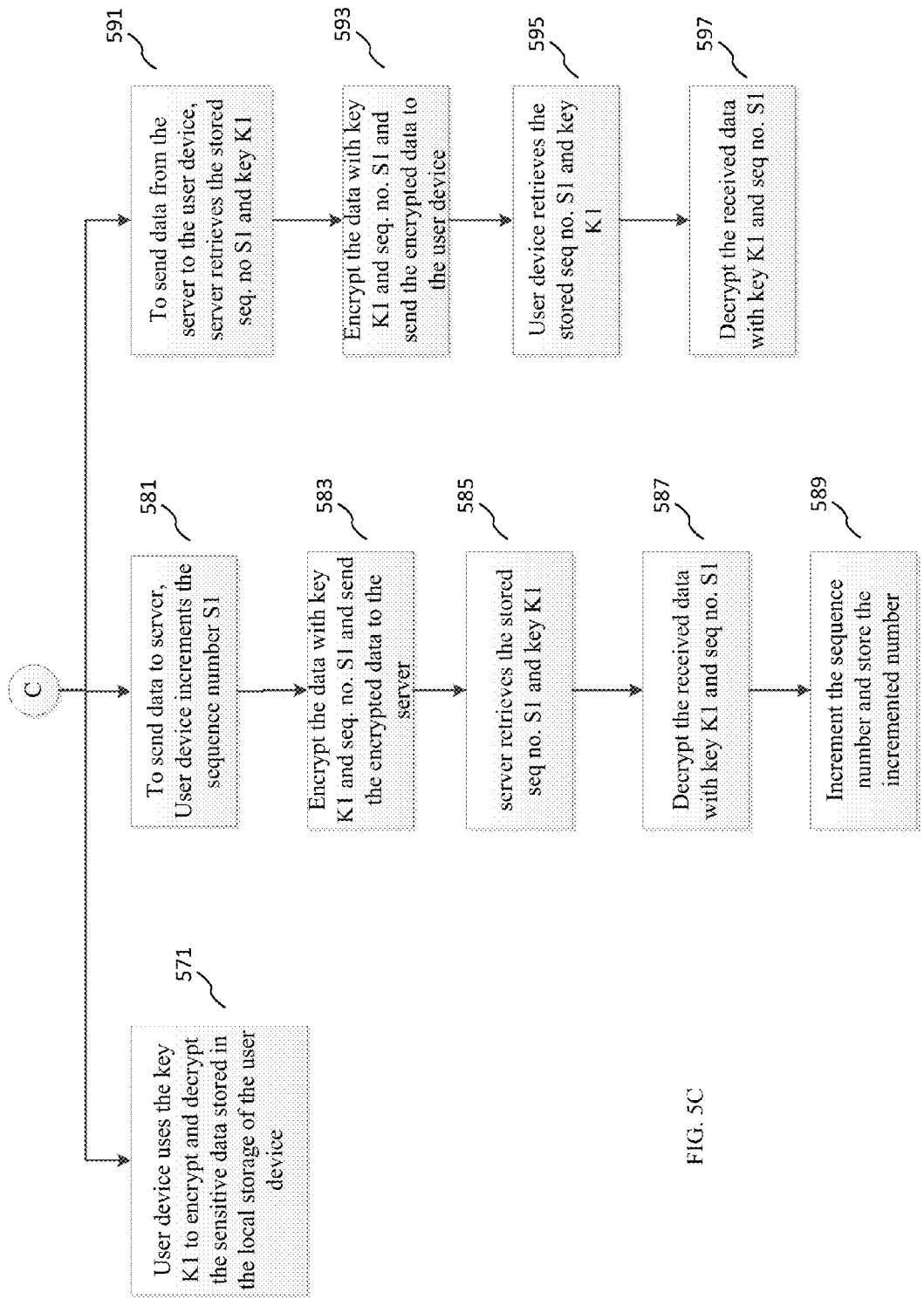

FIGS. 5A, 5B, 5C illustrates an example embodiment of the process of receiving an encryption key by a user device, to encrypt sensitive information in a secure manner as per an aspect of the present disclosure. At step 501, an application utilizing the process of secure communication is launched in the user device. At step 503, it may be verified if the application is launched first time or was it installed in the user device before. If the application is not launched first time on the user device, then the steps mention in FIG. 5B from step 541 will follow. However, if the application id launched first time, a unique device id may be generated at the user device at step 505. The unique device id can be generated using MSISDN, IMEI, random number or the combination thereof. At step 507, the generated unique device id is stored in the memory of the user device. At step 509, user device may receive user credentials like username, password and verification code from a user. At step 511, user device may generate a one way hash using the password and verification code provided by the user. At step 513, user device sends username, device id and the generated one way hash to the server. At step 515, at server the received username and hash are verified. If not verified, a message is send to the user device for again sending the username, device id and hash. Then, the user device repeats the steps from step 509 wherein it receives the username, password and verification code from the user. After the username and hash are verified, at step 517, a new encryption key K1 and a random sequence number S1 are generated. At step 519, the generated encryption key K1 and sequence number S1 are stored may be in a database corresponding to the username and the device id. At step 521, encryption key K1 and sequence number S1 are encrypted with a pre-defined key K2 and verification code. At step 523, the encrypted encryption key K1 and sequence number are send to the user device. At step 525, the user device used pre-defined key K2 and the verification code to decrypt the encryption key K1 and sequence number S1. Therefore, the encryption key K1 and sequence number S1 can be used to encrypt sensitive data. Some of the illustrations of using the encryption key K1 and sequence number S1 to encrypt sensitive data are explained with respect to FIG. 5C below.

In another illustration as illustrated in FIG. 5B, if the application is already launched on the user device, then at step 541, username and password may be received at the user device. At step 543, sequence number S1 and device id are retrieved from the memory of the user device corresponding to the received username. At step 545, a one way hash is generated using the password and the retrieved sequence number. At step 547, username, hash and device id are send to the server. At step 549, username and hash are verified at server. If the username and hash are not verified, a message is send to the user device for again sending the username, device id and hash. Then, the user device repeats the steps from step 541 wherein it receives the username and password from the user. If the username and hash are verified, at step 551, the encryption key K1 and sequence number S1 are retrieved at server corresponding to the username and the device id. At step 553, the encryption key K1 are encrypted using a pre-defined key K2 and sequence number S1. At step 555, the encrypted encryption key K1 is sent to the user device. At step 557, the user device uses the pre-defined key K2 and the sequence number S2 to decrypt the key K1 which can be used to encrypt sensitive data as explained in some of the illustrations in FIG. 5C.

FIG. 5C illustrates some of the examples of the usage of encryption key K1 and sequence number S1 in encrypting sensitive data. In one embodiment (as shown in step 571), user device may use the encryption key K1 to encrypt and decrypt the sensitive data stored in the local storage of the user device. Alternatively, both the encryption key K1 and sequence number S1 can be utilized to encrypt or decrypt the sensitive data stored in the local storage of the user device.

In another embodiment, at step 581, while sending the data to the server, user device can increment the sequence number S1. At step 583, the data is encrypted using the encryption key K1 and sequence number S1 and send to the server. At step 585, server retrieves the stored sequence number S1 and the encryption key K1. At step 587, the received data is decrypted using the encryption key K1 and sequence number S1. At step 589, the sequence number is incremented and store in the local memory of the server. Hence, for the next transaction of the encrypted data, the incremented sequence number may be used both at the user device and the server side.

In yet another embodiment, at step 591, for sending the data from the server to the user device, server retrieves the encryption key K1 and sequence number S1 corresponding to the username and the device id where the data is required to be send. At step 593, the data is encrypted using the encryption key K1 and sequence number S1 and send to the user device. At step 595, user device retrieves the stored sequence number S1 and encryption key K1 and use them to decrypt the received data at step 597. As appreciated by the person skilled in the art, the usage of the encryption key and sequence number are not limited to the illustrations mentioned above and there can be more usage scenarios.

Exemplary Computing Environment

Figure 6:
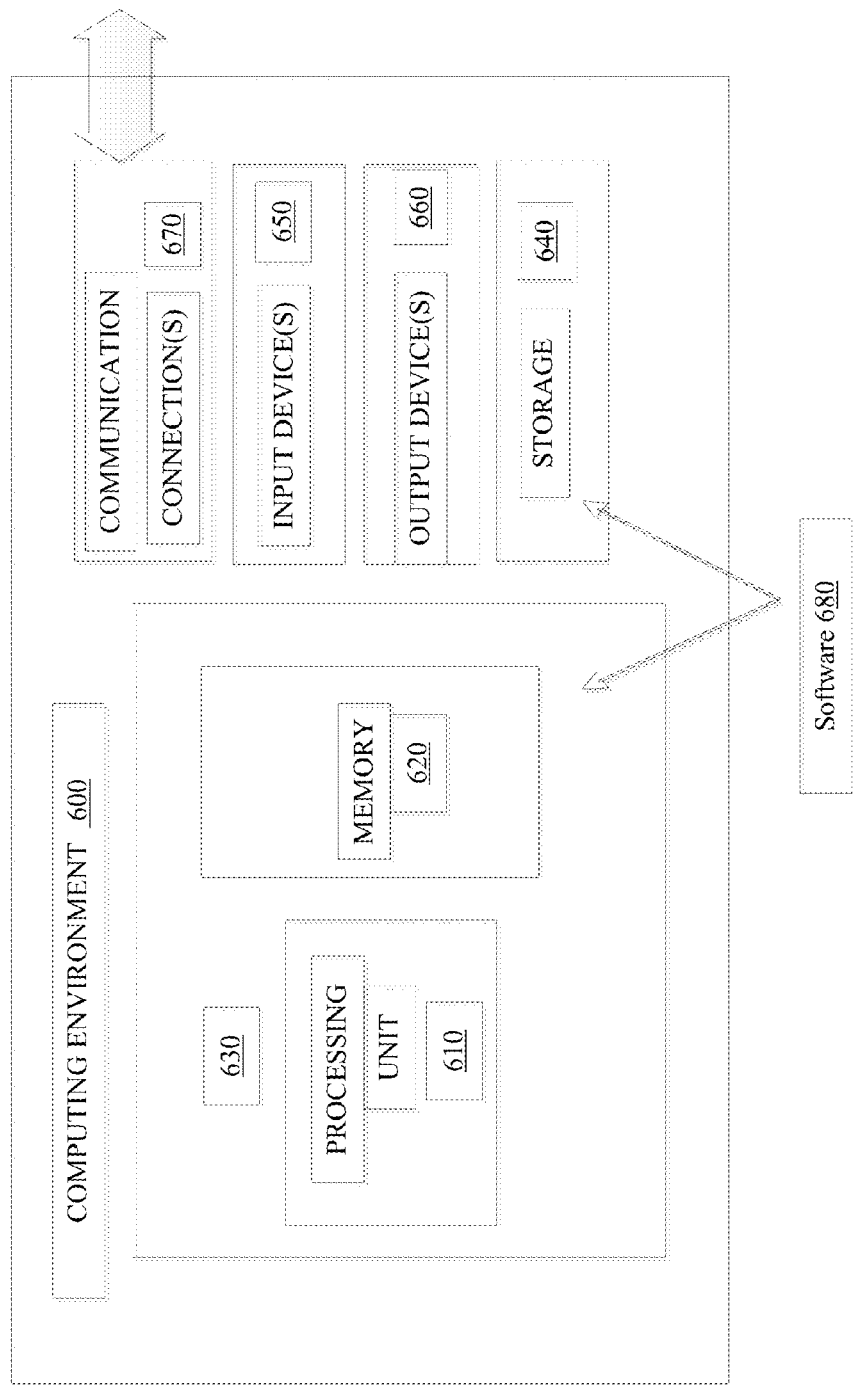
FIG. 6 shows an exemplary computing device useful for performing processes disclosed herein.

One or more of the above-described techniques may be implemented in or involve one or more computer systems. FIG. 6 illustrates a generalized example of a computing environment 600. The computing environment 600 is not intended to suggest any limitation as to scope of use or functionality of described embodiments.

With reference to FIG. 6, the computing environment 600 includes at least one processing unit 610 and memory 620. In FIG. 6, this most basic configuration 630 is included within a dashed line. The processing unit 610 executes computer-executable instructions and may be a real or a virtual processor. In a multi-processing system, multiple processing units execute computer-executable instructions to increase processing power. The memory 620 may be volatile memory (e.g., registers, cache, RAM), non-volatile memory (e.g., ROM, EEPROM, flash memory, etc.), or some combination of the two. In some embodiments, the memory 620 stores software 680 implementing described techniques.

A computing environment may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, CD-RWs, DVDs, or any other medium which may be used to store information and which may be accessed within the computing environment 600. In some embodiments, the storage 640 stores instructions for the software 1080.

The input device(s) 650 may be a touch input device such as a keyboard, mouse, pen, trackball, touch screen, or game controller, a voice input device, a scanning device, a digital camera, or another device that provides input to the computing environment 600. The output device(s) 660 may be a display, printer, speaker, or another device that provides output from the computing environment 600.

The communication connection(s) 670 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 600, computer-readable media include memory 620, storage 640, communication media, and combinations of any of the above.

One or more computer-readable media (e.g., storage media) or one or more processor-readable media (e.g., storage media) can comprise computer-executable instructions causing a computing system (e.g., comprising one or more processors coupled to memory) (e.g., computing environment 600 or the like) to perform any of the methods described herein. Examples of such computer-readable or processor-readable media include magnetic media, optical media, and memory (e.g., volatile or non-volatile memory, including solid state drives or the like).

Having described and illustrated the principles of our invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A computer-implemented method executed by one or more computing devices for secure data communication, the method comprising:
    receiving one or more user credentials, a device id, and a first hash from a user device, wherein the first hash is generated using the one or more user credentials;
    verifying the first hash with a second hash wherein the second hash is computed from the one or more user credentials;
    generating an encryption key and a sequence number corresponding to the one or more user credentials and the device id;
    encrypting the encryption key and the sequence number using a pre-defined key and the one or more user credentials;
    sending the encrypted encryption key and the encrypted sequence number to the user device to encrypt data;
    receiving encrypted data from the user device; and
    decrypting the encrypted data using the encryption key and the sequence number.

2. The method of claim 1, further comprising:
    enabling the user device to encrypt the data using the encryption key; and
    enabling the user device to store the encrypted data and the sequence number in the user device.

3. The method of claim 1, further comprising:
    enabling the user device to encrypt the data using the encryption key and the sequence number;
    enabling the user device to increment the sequence number and store the sequence number in the user device; and
    retrieving the encryption key and the sequence number corresponding to the one or more user credentials and the device id.

4. The method of claim 3, further comprising:
    incrementing the sequence number; and
    storing the incremented sequence number corresponding to the one or more user credentials and the device id.

5. The method of claim 1, further comprising:
    encrypting the additional data using the encryption key and the sequence number;
    sending the encrypted additional data to the user device; and
    enabling the user device to decrypt the additional data using the encryption key and the sequence number.

6. The method of claim 1, wherein the one and more user credentials comprise a user ID, a password, and a verification code.

7. The method of claim 1, wherein the device id is generated using MSISDN, IMEI, MAC address, or a combination thereof.

8. A computer program product comprising a non-transitory computer-readable medium comprising computer-readable program code embodied therein that when executed causes a computing system to perform the method of claim 1.

9. A computer-implemented method executed by a user device for secure data communication, the method comprising:
receiving one or more user credentials from a user;
generating a first hash of the one or more user credentials;
sending the one or more user credentials, a device id, and the first hash to a server;
receiving an encrypted encryption key and an encrypted sequence number from the server;
decrypting the encrypted encryption key and the encrypted sequence number using a pre-defined key and the one or more user credentials; and
encrypting data using the decrypted encryption key and the decrypted sequence number.

10. The method of claim 9, further comprising:
storing the encrypted data and the decrypted sequence number.

11. The method of claim 9, further comprising:
incrementing the decrypted sequence number; and
sending the encrypted data to the server.

12. A computer program product comprising a non-transitory computer-readable medium comprising computer-readable program code embodied therein that when executed causes a user device to perform the method of claim 9.

13. A computer-implemented method executed by one or more computing devices for secure data communication, the method comprising:
receiving one or more user credentials, a device id, and a first hash from a user device, wherein the first hash is generated using the one or more user credentials and a sequence number stored at the user device;
verifying the first hash with a second hash wherein the second hash is computed from the one or more user credentials and the sequence number;
generating an encryption key corresponding to the one or more user credentials and the device id;
encrypting the encryption key using a pre-defined key and the sequence number; and
sending the encrypted encryption key to the user device to encrypt data.

14. The method of claim 13, further comprising:
enabling the user device to encrypt data using the encryption key; and
enabling the user device to store the encrypted data and the sequence number in the user device.

15. The method of claim 13, further comprising:
enabling the user device to encrypt data using the encryption key and the sequence number;
enabling the user device to increment the sequence number;
receiving the encrypted data;
retrieving the encryption key and the sequence number corresponding to the one or more user credentials and the device id; and
decrypting the encrypted data using the retrieved encryption key and the sequence number.

16. The method of claim 15, further comprising:
incrementing the sequence number; and
storing the incremented sequence number corresponding to the one or more user credentials and the device id.

17. The method of claim 13, further comprising:
encrypting data using the encryption key and the sequence number;
sending the encrypted data to the user device; and
enabling the user device to decrypt the encrypted data using the encryption key and the sequence number.

18. A computer program product comprising a non-transitory computer-readable medium comprising computer-readable program code embodied therein that when executed causes a computing system to perform the method of claim 13.

19. A system for secure data communication comprising:
a user device configured to:
receive one or more user credentials from a user; and
generate a first hash using the one or more user credentials; and a server configured to:
receive the one or more user credentials, a device id and the first hash from the user device over a network;
verify the first hash with a second hash wherein the second hash is computed from the one or more user credentials;
generate an encryption key and a sequence number corresponding to the one or more user credentials and the device id;
encrypt the generated encryption key and the generated sequence number using the encryption key and the one or more user credentials;
send the encrypted generated encryption key and the encrypted generated sequence number to the user device over the network;
receive encrypted data over the network from the user device, wherein the received encrypted data is encrypted with the encryption key and the sequence number; and
decrypt the received encrypted data with the encryption key and the sequence number.

20. The system of claim 19, wherein the user device is further configured to:
decrypt the encrypted generated encryption key and the encrypted generated sequence number using the encryption key and the one and more user credentials.

21. The system of claim 20, wherein the user device is further configured to:
encrypt data using the encryption key; and
store the encrypted data and the sequence number in the user device.

22. The system of claim 20, wherein the user device is further configured to:
encrypt data using the encryption key and the sequence number;
increment the sequence number and store it in the user device; and
send the encrypted data to the server.

23. The system of claim 19, wherein the server is further configured to:
encrypt data using the encryption key and the sequence number; and
send the encrypted data to the user device.

24. The system of claim 19, wherein the server is further configured to:
increment the sequence number and store it in the server.

25. The system of claim 19, wherein the one and more user credentials comprise a user ID, a password and a verification code.

26. The system of claim 19, wherein the device id is generated using MSISDN, IMEI, MAC address, or a combination thereof.

27. A computing device for secure data communication, the device comprising:
a processor; and
a memory operatively coupled to the processor, the memory storing computer executable instructions which, when executed by the processor, cause the processor to carry out a method comprising:

receiving one or more user credentials, a device id and a first hash from a user device wherein the first hash is generated using the one or more user credentials;

verifying the first hash with a second hash wherein the second hash is computed from the one or more user credentials;

generating an encryption key and a sequence number corresponding to the one or more user credentials and the device id;

encrypting the encryption key and the sequence number using a pre-defined key and the one or more user credentials;

sending the encrypted encryption key and the encrypted sequence number to the user device to encrypt data;

receiving the encrypted data from the user device;

retrieving the encryption key and the sequence number corresponding to the one or more user credentials and the device id; and decrypting the encrypted data using the encryption key and the sequence number.

28. The computing device of claim 27, wherein the method further comprises:

encrypting the data using the encryption key and the sequence number.

29. The computing device of claim 27, wherein the method further comprises:

incrementing the sequence number and storing the incremented sequence number in a server.

30. A computing device for secure data communication, the device comprising:

a processor; and a memory operatively coupled to the processor, the memory storing computer executable instructions which, when executed by the processor, cause the processor to carry out a method comprising:

receiving one or more user credentials, a device id and a first hash from a user device, wherein the first hash is generated using the one or more user credentials and a sequence number stored at the user device;

verifying the first hash with a second hash wherein the second hash is computed from the one or more user credentials and the sequence number;

generating an encryption key corresponding to the one or more user credentials and the device id;

encrypting the encryption key using a pre-defined key and the sequence number;

sending the encrypted encryption key to the user device to encrypt data;

receiving encrypted data from the user device;

retrieving the encryption key and the sequence number corresponding to the one or more user credentials and the device id;

incrementing the sequence number and storing the incremented sequence number in a server;

decrypting the encrypted data using the encryption key and the incremented sequence number;

encrypting response data using the encryption key and the incremented sequence number; and sending the encrypted response data to the user device.

\* \* \* \* \*